July 22, 1941.   H. F. NISSEN   2,249,975
APPARATUS FOR INDICATING THE AMPLITUDE OF THE SOUND RECORD
MADE BY A SOUND-FILM CINEMATOGRAPH CAMERA
Filed Oct. 14, 1938   2 Sheets-Sheet 1

Inventor
Hans Friedrich Nisse
By His Attorneys

Patented July 22, 1941

2,249,975

UNITED STATES PATENT OFFICE 2,249,975

APPARATUS FOR INDICATING THE AMPLITUDE OF THE SOUND RECORD MADE BY A SOUND-FILM CINEMATOGRAPH CAMERA

Hans Friedrich Nissen, Dessau, Germany, assignor, by mesne assignments, to General Aniline & Film Corporation, New York, N. Y., a corporation of Delaware Application October 14, 1938, Serial No. 234,926
In Germany October 25, 1937

1 Claim. (Cl. 88—16.2)

This invention relates to the input control in sound recording apparatus, and more particularly to easily visible indicating means for the input control in motion picture cameras where picture and sound are recorded on a single film.

It has hitherto been difficult to observe simultaneously both the picture and the intensity of the sound in sound-film cinematograph cameras, especially in those in which the sound record and the pictures are recorded on the same film and which are operated by a single person, as is, for example, generally the case in cameras used by amateurs. The operator has been assisted by the provision of an indicator of the amplitude of the sound record, (input control means) but the known arrangements have the drawback that the picture and the indicating device cannot be controlled simultaneously.

It is therefore an object of the present invention to provide an input control means for sound recording apparatus, wherein the indicator or an image thereof is visible in the view finder of the camera.

A further object resides in the provision of input control means of the character referred to, wherein the whole or a part of that part of the light from the slit image used to form the sound record on the film which, at the prevailing amplitude of the sound, does not fall on the film is used to indicate the amplitude of the sound record.

Other and still further objects will appear as the following detailed specification proceeds.

It has further been proposed that the indicator of the amplitude of the sound record, or an image thereof, be made visible in the view finder. For example a glow-lamp such as has hitherto frequently been used as an indicator for this purpose can be placed in the view finder.

In the operation of such an indicator a certain amount of energy is consumed; if this energy is derived from the amplifier which actuates the recording device, the amplification must be made correspondingly stronger, which would encumber the apparatus and is clearly undesirable.

Reference is made to the accompanying drawings, in which

I have found that any loss of energy can be avoided if the whole or a part of that part of the light from the slit image used to form the sound record on the film which, at the prevailing amplitude of the sound, does not fall on the film, is used to indicate the amplitude of the sound record. The light can be projected into the view finder by prisms, mirrors or the like. To assist the recognition of the prevailing amplitude, the light can be passed through various filters, so arranged that in the position of rest, light filtered in a certain manner enters the view finder and is intensified as the amplitude increases, while when the amplitude is too great the light passes through a further differently colored filter, so that this excessive amplitude can be immediately recognized in a change of color.

Figure 1:
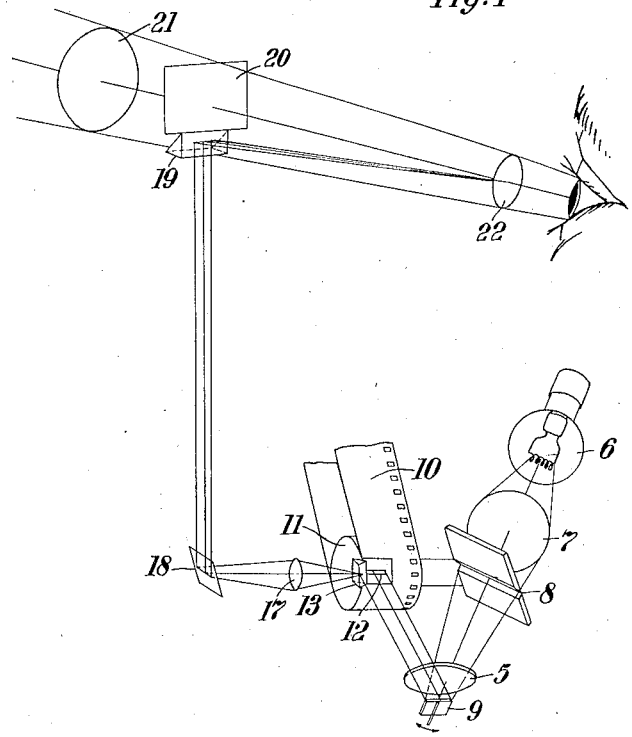
Figure 1 shows diagrammatically indicating means for the sound input in combination with the view finder of a motion picture camera.

In the drawings, in the indicating apparatus illustrated diagrammatically in Figure 1 a slit 8, illuminated by a source of light 6 and a condenser 7, is projected by the lens system 5 on a mirror 9 which oscillates in synchrony with the sound waves to be recorded. The image of the slit in the mirror 9 is projected by the lens system 5 on a film 10 which runs over a sound drum 11. The image of the slit incident on the film is limited by a screen having a slit 12 and situated in front of the film. Also arranged in front of the sound drum is a prism 13 on which falls in the position of rest a part of the slit image which does not fall on the slit 12, as shown on a larger scale in Figure 2. By this prism the beam of light is deflected through lens 17 to the reflecting surface 18, and from there through another prism 19 into the viewing field of the view finder 20—22.

Figure 2:
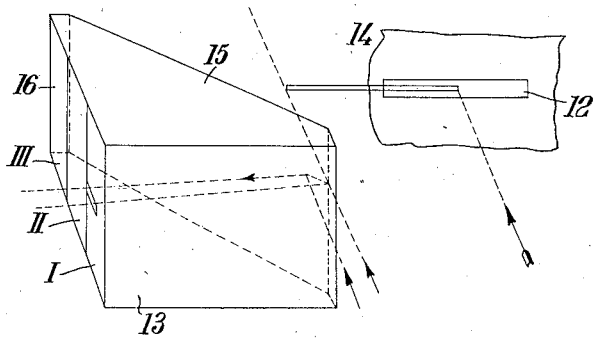
Figure 2 is a diagrammatic view in an enlarged scale of the optical arrangement defined as reference numerals 12 and 13 in Figure 1.

In Figure 2, the rear surface 15 of the prism 13 is silvered and reflects the light falling upon it on to the surface 16, thus forming an image of part of the slit 8. In the position of rest about half the slit-image falls on the film while the other half is screened therefrom. A part of this screened light falls on the prism 13 and is reflected by the silvered surface 15 on to the surface 16. The surface 16 is divided into three parts I, II and III which correspond with the scale of measurement of the amplitude. These parts can be differently colored, for example red, green and white.

Figure 3:
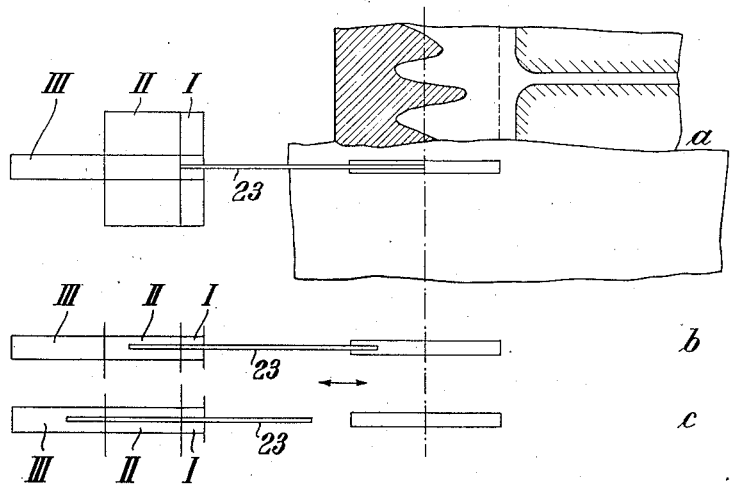
Figure 3 is a diagram explaining the manner of working of the indicating means showing the slit image in three possible positions.

When the sound recording apparatus is used, the slit image moves to and fro, as shown diagrammatically in Figure 3. At normal amplitude the slit image 23 moves, for example, from the position of rest $a$, in which only a part situated in the area I falls on the prism, into a position of maximum deflection b in which a part of the slit image enters the green-colored area II, so that a certain alteration of color of the slit-image, which is red in the position of rest, occurs. At too great an amplitude of the sound record as shown at c in Figure 3, the slit image moves entirely away from the slit 12 and enters in part the white area III, whereupon a great alteration of color and brightness occurs at once indicating excessive amplitude. Obviously the slit image does not move only in the direction shown in Figure 3, but moves to and fro. The image in the prism 13, however, appears to the eye to remain constant, as the oscillations are fairly rapid. The part of the slit image appearing in varying length and color on the surface 16 is projected by the lens 17 and the mirror 18 into the view finder 19 (Figure 1) and can there be observed simultaneously with the picture field as a patch of light.

I claim:

A combined motion picture camera and sound recording apparatus working according to the variable area system, comprising in combination means for throwing a beam of light of an illuminated slit controlled by the frequency and amplitude of the sound oscillation to be recorded on to a slitted screen situated in front of the sound recording portion of a motion picture film, a prism arranged adjacent to said screen in a position before the image of said slit formed by a lens so as to be struck by a part of the recording light normally screened off from said recording portion, the rear surface to said prism being in a position where there is formed an image of said slit and being silvered and adapted to reflect the light falling thereon onto the opposite surface of said prism, said opposite surface being divided into three differently colored parts, whereby on lateral movement of the light beam entering the prism different parts of said opposite surface are penetrated by the reflected light and give to said light different characteristic colors, and reflecting means adapted to throw said colored light into the picture field of the view finder of said motion picture camera.

HANS FRIEDRICH NISSEN.